(12) United States Patent
Kitagawa

(10) Patent No.: US 8,590,860 B2
(45) Date of Patent: Nov. 26, 2013

(54) MALE JOINT MEMBER FOR PIPE JOINT

(75) Inventor: Hiroyuki Kitagawa, Matsudo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 86 days.

(21) Appl. No.: 13/432,281

(22) Filed: Mar. 28, 2012

(65) Prior Publication Data
US 2012/0180891 A1 Jul. 19, 2012

Related U.S. Application Data

(63) Continuation of application No. PCT/JP2010/066927, filed on Sep. 29, 2010.

(30) Foreign Application Priority Data

Sep. 30, 2009 (JP) .................................. 2009-228433

(51) Int. Cl.
F16K 25/00 (2006.01)
F16L 37/28 (2006.01)

(52) U.S. Cl.
USPC .......................... 251/149.6; 251/149.3; 251/85

(58) Field of Classification Search
USPC ............ 251/84, 85, 149, 149.1, 149.3, 149.6, 251/333, 337; 137/614.01–614.06
See application file for complete search history.

(56) References Cited

U.S. PATENT DOCUMENTS

| | | | | |
|---|---|---|---|---|
| 1,383,209 A | * | 6/1921 | Iftiger | 251/149.6 |
| 1,942,417 A | * | 1/1934 | Ferlin et al. | 137/332 |
| 2,166,402 A | * | 7/1939 | Gora | 285/316 |
| 2,485,006 A | * | 10/1949 | Main, Jr. et al. | 137/614.03 |
| 5,248,125 A | * | 9/1993 | Fritch et al. | 251/149.6 |
| 5,762,106 A | * | 6/1998 | Smith, III | 137/614.04 |

(Continued)

FOREIGN PATENT DOCUMENTS

| | | |
|---|---|---|
| JP | 62-110096 A | 5/1987 |
| JP | 11-280976 A | 10/1999 |

(Continued)

OTHER PUBLICATIONS

International Search Report for International Application No. PCT/JP2010/066927, dated Dec. 14, 2010, 2 pages.

Primary Examiner — John K Fristoe, Jr.
Assistant Examiner — Hailey K Do
(74) Attorney, Agent, or Firm — Brinks Gilson & Lione

(57) ABSTRACT

A male coupling member is configured such that, even if a front end surface of a valve member is hit with a hammer, the valve member cannot bite into an opening surface of a coupling body. The male coupling member has a coupling body, a valve member, and a spring member. The valve member has a front end portion fitted into a front end opening of the coupling body, and a valve body. The front end portion has a circular front end surface, a front end annular surface having a smaller diameter than an opening surface of the coupling body, and a reduced-diameter surface having a smaller diameter than the front end annular surface. The reduced-diameter surface is configured such that when the valve member is tilted and, consequently, the reduced-diameter surface engages a rear end edge of the opening surface, the length b from the point of engagement between the reduced-diameter surface and the rear end edge to the outer peripheral edge of the front end surface of the valve member through the axis of the valve member is not larger than the diameter a of the front end surface.

20 Claims, 5 Drawing Sheets

(56) References Cited

U.S. PATENT DOCUMENTS

| | | | |
|---|---|---|---|
| 7,028,983 B2 * | 4/2006 | Ozaki et al. | 251/149.6 |
| 2005/0098753 A1 | 5/2005 | Ozaki et al. | |
| 2010/0051129 A1 | 3/2010 | Kitagawa | |

FOREIGN PATENT DOCUMENTS

| | | |
|---|---|---|
| JP | 2000-234687 A | 8/2000 |
| JP | 2005-147169 A | 6/2005 |
| JP | 3909339 B1 | 4/2007 |

* cited by examiner

MALE JOINT MEMBER FOR PIPE JOINT

RELATED APPLICATIONS

This application is a continuation of PCT/JP2010/066927 filed on Sep. 29, 2010, which claims priority to Japanese Application No. JP2009-228433 filed on Sep. 30, 2009. The entire contents of these applications are incorporated herein by reference.

BACKGROUND OF THE INVENTION

1. Field of the Invention

The present invention relates to male coupling members of pipe couplings and, more particularly, to a male coupling member having an on-off valve.

2. Description of the Related Art

There is a male coupling member having a tubular coupling body having a through-hole extending from a front end opening to a rear end opening, and an on-off valve set in the coupling body. The front end opening of the coupling body is defined by an inner peripheral surface of a uniform diameter that extends a short distance rearward from the front end surface of the coupling body. The on-off valve has a valve member urged forward by a spring member. The outer peripheral surface of a front end portion of the valve member is fitted into the inner peripheral surface of the front end opening of the coupling member. In this state, the on-off valve is placed in a closed position. (See Patent Literature 1)

In the above-described male coupling member, the on-off valve is brought into an open position as a result of the valve member being pushed in rearward by a female coupling member to be connected with the male coupling member.

However, when a high-pressure fluid remains in the male coupling member, the residual pressure may prevent the valve member from being moved even if an operator tries to connect the male and female coupling members to each other. In such a case, the operator usually moves the valve member rearward by hitting the front end surface of the valve member with a hammer or the like, thereby allowing the residual pressure to escape.

However, when the valve member is hit with a hammer as stated above, the valve member may tilt, failing to move parallel to the axis of the tubular coupling body, resulting in the peripheral surface of the valve member biting into the peripheral wall surface of the front end opening of the coupling body. The valve member in such a condition cannot be moved with a hammer or the like. Consequently, the coupling member may become unusable, causing a serious hindrance to the operation.

CITATION LIST

Patent Literature

Japanese Patent No. 3909339

SUMMARY OF THE INVENTION

The present invention has been made in view of the above-described circumstances, and an object of the present invention is to provide a male coupling member of a pipe coupling that is configured to prevent the above-described biting of the valve member from occurring even if an operator hits the valve member with a hammer.

The present invention provides a male coupling member (denoted by reference numeral 10 in the following description of embodiments of the present invention; numerals in the following parentheses show a similar relation in the embodiments) of a pipe coupling. The male coupling member has a tubular coupling body (12) having an inner peripheral surface (26) defining a through-hole (24) extending from a front end opening (20) to a rear end opening (22). The inner peripheral surface has an annular opening surface (28) parallel to an axis (X) of the coupling body (12). The opening surface 28 defines the front end opening (20). The inner peripheral surface further has a sloped annular valve seat surface (32) diverging radially outward as the annular valve seat surface extends rearward from a circular rear end edge (30) of the opening surface. Further, the inner peripheral surface has a cylindrical surface (34) extending contiguously rearward from the annular valve seat surface (32). The male coupling member further has a valve member (14) set in the coupling body (12). The valve member has a front end portion (36) fitted into the front end opening (20), and a valve body (38) extending contiguously rearward from the front end portion (36). The front end portion (36) has a circular front end surface (40), a front end annular surface (42) extending rearward from an outer peripheral edge of the front end surface (40) and having a smaller diameter than the opening surface (28), and a reduced-diameter surface (44) extending contiguously rearward from the front end annular surface and having a smaller diameter than the front end annular surface (42). The valve body (38) has an annular seal member (50) engageable with the annular valve seat surface (32) of the coupling body (12). Further, the male coupling member has a spring member (16) urging the valve member (14) forward to place the valve member (14) in a closed position where the front end portion (36) of the valve member is inserted into the front end opening (20) and where the seal member (50) is sealingly engaged with the annular valve seat surface (32). The spring member allows the valve member (14) to assume an open position where the seal member (50) is separate from the annular valve seat surface (32) when the valve member (14) is displaced rearward by a rearward force applied to the front end surface (40) of the valve member (14). The reduced-diameter surface (44) is configured such that when a rearward force is applied to the front end surface (40) of the valve member (14), causing the valve member (14) to tilt so that the front end surface (40) tilts relative to the axis (X) of the through-hole (24), resulting in the reduced-diameter surface (44) engaging the circular rear end edge (30) of the opening surface (28), the length (b, b1, b2) from the point (A) of engagement between the circular rear end edge (30) and the reduced-diameter surface (44) to the outer peripheral edge (41) of the front end surface (40) of the valve member (14) through the axis (X) of the valve member is equal to or smaller than the diameter of the opening surface (28).

In the male coupling member, when the valve member (14) tilts so that the reduced-diameter surface (44) engages the circular rear end edge (30) of the opening surface (28) of the coupling body (12), the length (b, b1, b2) from the point (A) of engagement between the circular rear end edge (30) and the reduced-diameter surface (44) to the outer peripheral edge (41) of the front end surface (40) of the valve member (14) through the axis (X) of the valve member is equal to or smaller than the diameter of the opening surface (28). Therefore, the peripheral surface of the valve member (14) cannot bite into the opening surface (28) of the coupling body. Accordingly, it is possible to avoid a situation that may occur in the conventional male coupling member as stated above, i.e. a situation in which the tilted valve member bites into the opening surface of the coupling body so as to become immovable. The term "equal to the diameter" in the above also covers a situation where "the length is substantially equal to the diameter", i.e. such a structure that the above-described length is slightly larger than the diameter of the opening surface; therefore, when tilting, the valve member may bite into the opening surface, but the biting is slighter than in a structure where the reduced-diameter surface is not provided.

The reduced-diameter surface (44) may be formed with a step between itself and the front end annular surface (42) of the front end portion (36). The reduced-diameter surface may be coaxial with the front end annular surface (42) and have a uniform diameter. In addition, the reduced-diameter surface (44) may be a sloped surface contiguous with the front end annular surface (42) extending rearward from the outer peripheral edge (41) of the front end surface (36), the sloped surface having a diameter gradually decreasing rearward from the front end annular surface.

The reduced-diameter surface (44) may be adjacent to the circular rear end edge (30) of the opening surface (28) and may extend forward of the rear end edge (30). This structure takes into account the fact that when the valve member (14) is tilted by being hit with a hammer or the like, it is likely that the valve member will tilt while being pushed in somewhat rearward.

Specifically, the valve body (38) may have a sloped annular surface (48) diverging radially outward as it extends rearward from the rear end edge of the reduced-diameter surface (44), and the annular seal member (50) may be fitted to the sloped annular surface.

In addition, the spring member (16) may be a compression coil spring coaxially set in the through-hole (24) of the coupling body (12). The valve member (14) may have a projection (52) provided on the center of the rear end surface of the valve body (38) and a spring retaining member (56) formed from a metal plate and connected and secured to the projection (50), the spring retaining member having an annular spring retaining portion (54) engaged with the front end of the compression coil spring (16) and a tubular spring support portion (55) tubularly extending rearward from the outer peripheral edge of the spring retaining portion.

The conventional valve member shown in Patent Literature 1 is provided with an elongated shank extending rearward from the center of the rear end surface of the valve body, and a compression coil spring is set around the shank. In this case, the valve member having the shank is produced by cutting process. In contrast, the above-described valve member according to the invention of this application has a spring retaining member formed from a metal plate to retain a compression coil spring. Therefore, the projection on the center of the rear end surface of the valve body only needs to be long enough for the spring retaining member to be connected and secured thereto. Thus, the projection may be short, which allows a reduction in the manufacturing cost as compared to the above-described conventional valve member. In addition, because no shank is needed, the valve member can be reduced in length.

The present invention will be explained below based on an embodiment shown in the accompanying drawings.

DETAILED DESCRIPTION OF THE PREFERRED EMBODIMENTS

Figure 1:
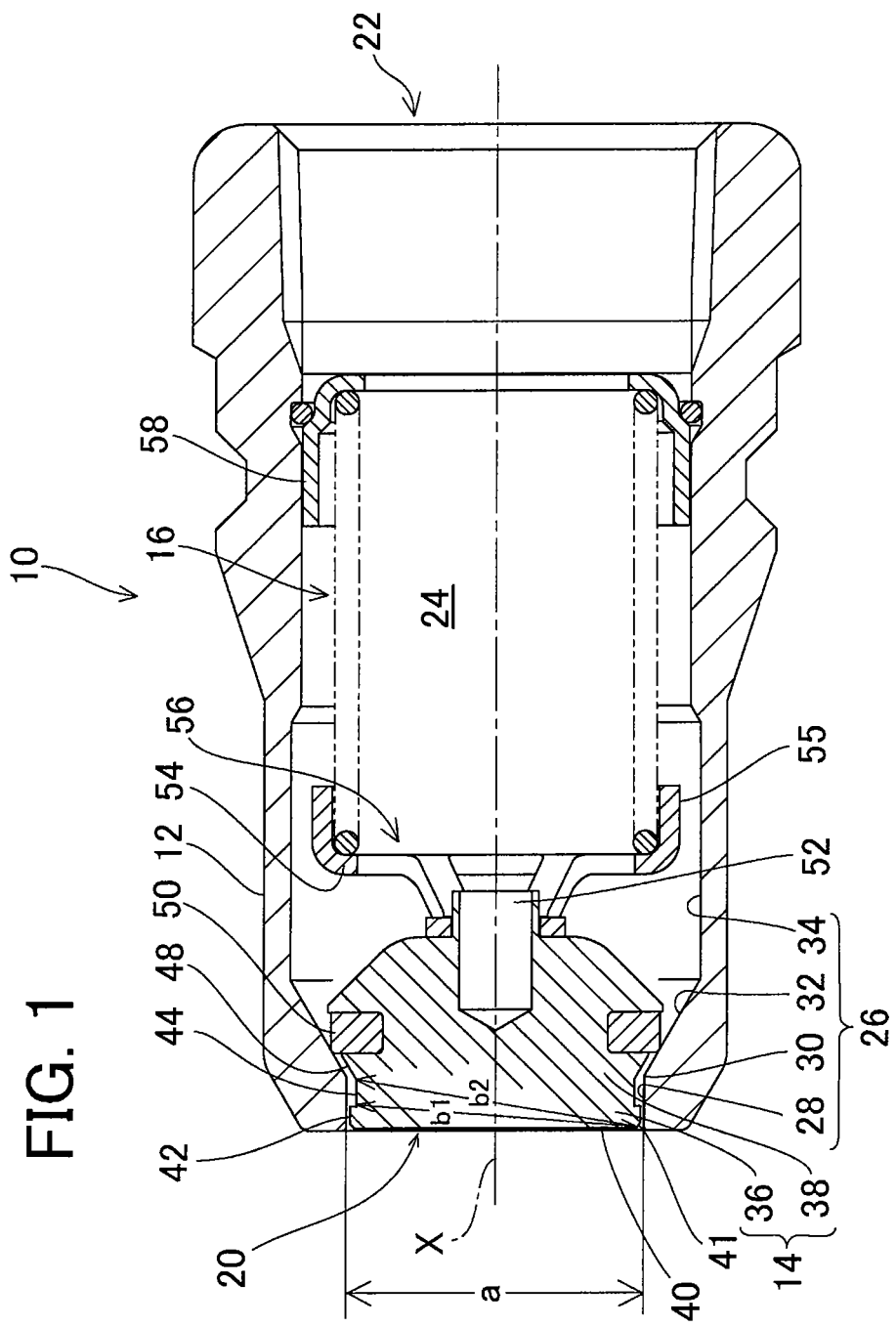
FIG. 1 is a longitudinal sectional view of a male coupling member of a pipe coupling according to the present invention, showing a state where a valve member is in a closed position.

A male coupling member 10 shown in FIG. 1 constitutes a pipe coupling together with a female coupling member (not shown) and is removably inserted into and connected to the female coupling member.

The male coupling member 10 has a tubular coupling body 12, a valve member 14 set in the coupling body, and a spring member, i.e. a compression coil spring 16 in the illustrated example, which urges the valve member 14 forward.

The coupling body 12 has an inner peripheral surface 26 defining a through-hole 24 extending from a front end opening 20 to a rear end opening 22. The inner peripheral surface 26 has an annular opening surface 28 parallel to an axis X of the coupling body 12. The annular opening surface 28 defines the front end opening 20. The inner peripheral surface 26 further has a sloped annular valve seat surface 32 diverging radially outward as it extends rearward from a circular rear end edge 30 of the opening surface 28, and a cylindrical surface 34 extending contiguously rearward from the annular valve seat surface 32.

The valve member 14 has a front end portion 36 insertable into the front end opening 20 of the coupling body 12, and a valve body 38 extending contiguously rearward from the front end portion 36.

The front end portion 36 of the valve member 14 has a circular front end surface 40, a front end annular surface 42 extending rearward from a chamfered outer peripheral edge 41 of the front end surface 40 and having a smaller diameter than the opening surface 28 of the coupling body 12, and a reduced-diameter surface 44 extending contiguously rearward from the front end annular surface 42 and having a smaller diameter than the front end annular surface 42. The reduced-diameter surface 44 is formed with a step between itself and the front end annular surface 42. The reduced-diameter surface 44 is coaxial with the front end annular surface 42 and has a uniform diameter. The reduced-diameter surface 44 extends forward from a position adjacent to the rear end edge 30 of the opening surface 28.

The valve body 38 has a sloped annular surface 48 diverging radially outward as it extends rearward from the rear end edge of the reduced-diameter surface 44. The sloped annular surface 48 is provided with an annular groove. The groove is fitted with an annular seal member 50. More specifically, a groove is formed in an upper-half annular portion of the sloped annular surface 48 (i.e. a right-hand portion of the sloped annular surface 48 that extends rightward from substantially the center thereof), and the annular seal member 50 is provided in the groove.

The valve member 14 has a projection 52 provided on the center of the rear end surface of the valve body 38 and a spring retaining member 56 formed from a metal plate and connected and secured to the projection 52. The spring retaining member 56 has an annular spring retaining portion 54 engaged with the front end of the compression coil spring 16 and a tubular spring support portion 55 extending rearward from the outer peripheral edge of the spring retaining portion 54. The compression coil spring 16 is supported at the rear end thereof by a spring support member 58 secured to the inner peripheral surface of the coupling body 12. The compression coil spring 16 urges the valve member 14 toward a closed position shown in FIG. 1.

Figure 2:
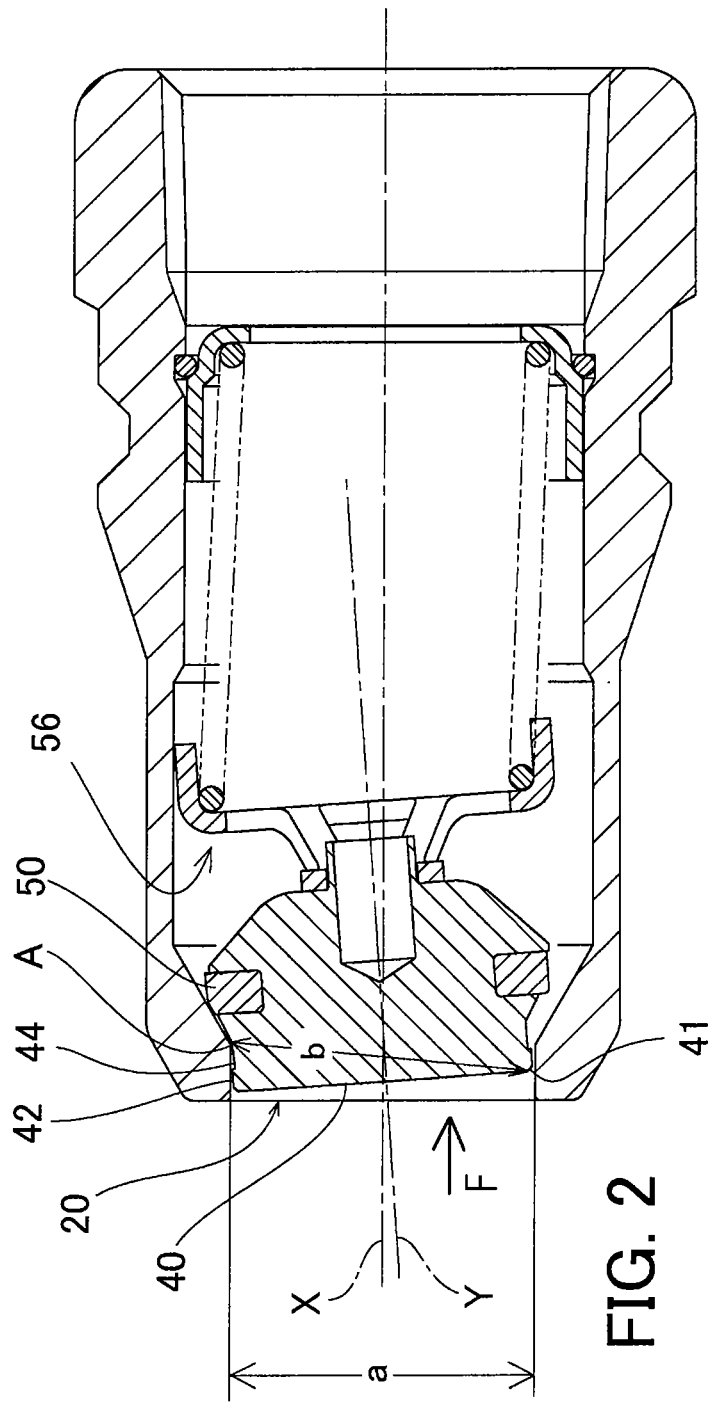
FIG. 2 is a longitudinal sectional view of the male coupling member according to the present invention, showing a state where the valve member tilts by being pushed in rearward with a force applied to a front end surface thereof.
Figure 3:
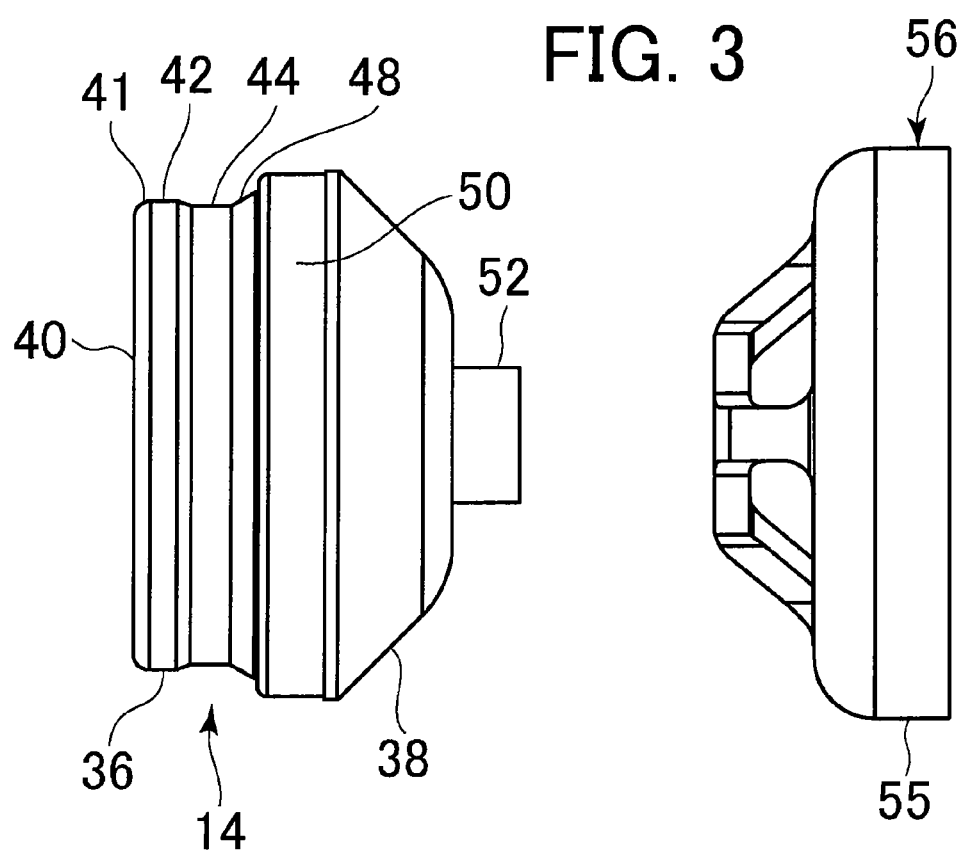
FIG. 3 is an exploded side view of the valve member in the pipe coupling in FIG. 1.
Figure 4:
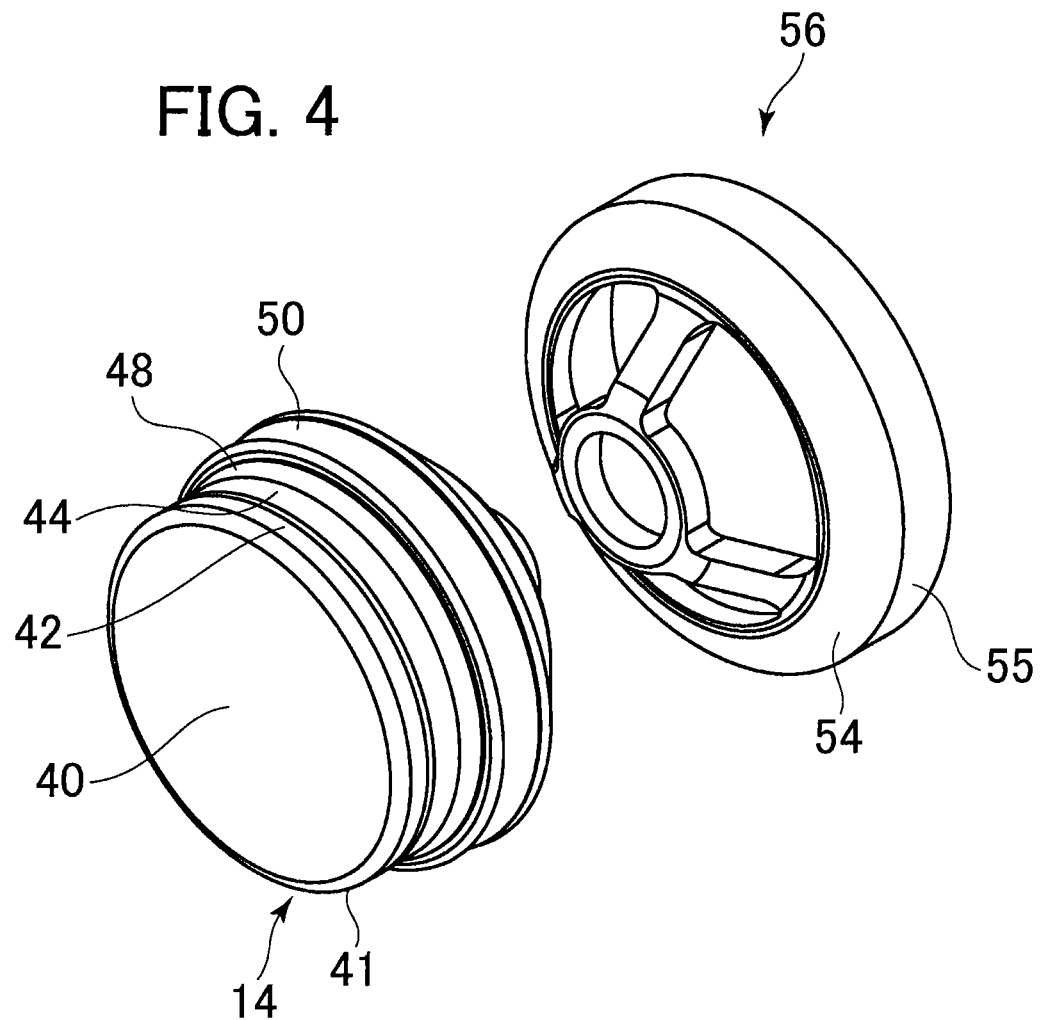
FIG. 4 is an exploded perspective view of the valve member in the pipe coupling in FIG. 1.

FIG. 2 shows the male coupling member in a state where the front end surface 40 of the valve member 14 is hit with a hammer or the like, and a force F (displaced downward from the axis Y of the valve member 14 as seen in FIG. 2) is applied to the valve member 14, causing the valve member 14 to tilt, resulting in the reduced-diameter surface 44 engaging the circular rear end edge 30 of the opening surface 28 of the coupling body 12. In the invention of this application, when the male coupling member is in the illustrated state, the length b from the point A of engagement between the rear end edge 30 of the opening surface 28 and the reduced-diameter surface 44 to the outer peripheral edge 41 of the front end surface 40 of the valve member 14 through the axis Y of the valve member 14 is equal to or smaller than the diameter a of the front end surface 40. In the illustrated example, the lengths b1 and b2 from the front and rear ends, respectively, of the reduced-diameter surface 44 to the outer peripheral edge of the front end surface 40 of the valve member 14 through the axis Y of the valve member 14 are set smaller than the diameter a of the front end surface 40 so that the above-described relationship holds no matter which part of the reduced-diameter surface 44 engages the rear end edge 30 of the opening surface 28. Accordingly, if the valve member 14 is caused to tilt as shown in the figure by the force F of hitting with a hammer, the valve member 14 moves backward without the peripheral surface of the valve member 14 biting into the opening surface 28, thereby allowing the fluid pressure in the male coupling member 10 to escape.

Figure 5:
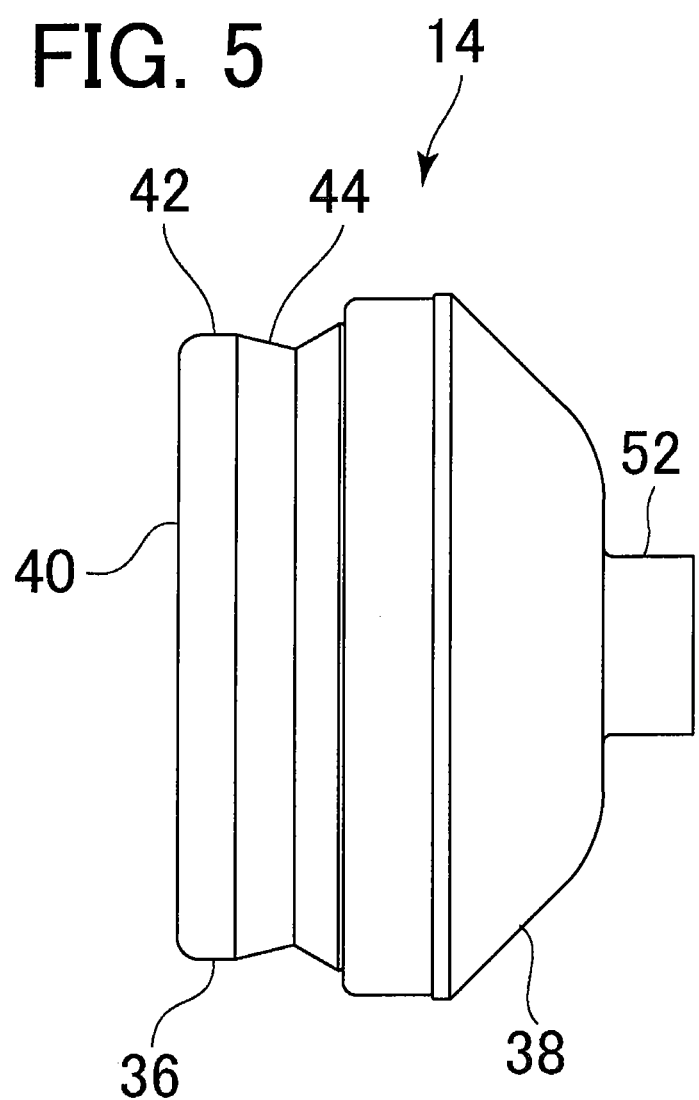
FIG. 5 is a side view of a modification of the valve member.

Although an embodiment of the male coupling member 10 according to the present invention has been described above, the present invention is not limited to the described embodiment. For example, the reduced-diameter surface 44 may be, as shown in FIG. 5, a tapered surface having a diameter gradually decreasing rearward from the rear end of the annular surface 42. Alternatively, the reduced-diameter surface 44 may be a curved surface.

What is claimed is:

1. A male coupling member of a pipe coupling, the male coupling member comprising:
   a tubular coupling body having an inner peripheral surface defining a through-hole extending from a front end opening to a rear end opening, the inner peripheral surface having an annular opening surface parallel to an axis of the coupling body, the annular opening surface defining the front end opening, the inner peripheral surface further having a sloped annular valve seat surface diverging radially outward as the annular valve seat surface extends rearward from a circular rear end edge of the opening surface, and the inner peripheral surface further having a cylindrical surface extending contiguously rearward from the annular valve seat surface;
   a valve member set in the coupling body, the valve member having:
      a front end portion fitted into the front end opening; and
      a valve body extending contiguously rearward from the front end portion;
      the front end portion having a circular front end surface, a front end annular surface extending rearward from an outer peripheral edge of the front end surface and having a smaller diameter than the opening surface, and a reduced-diameter surface extending contiguously rearward from the front end annular surface and having a smaller diameter than the front end annular surface;
   the valve body having an annular seal member engageable with the annular valve seat surface of the coupling body; and
   a spring member urging the valve member forward to place the valve member in a closed position where the front end portion of the valve member is inserted into the front end opening and where the seal member is sealingly engaged with the annular valve seat surface, the spring member allowing the valve member to assume an open position where the seal member is separate from the annular valve seat surface when the valve member is displaced rearward by a rearward force applied to the front end surface of the valve member;
   wherein the reduced-diameter surface is configured such that when a rearward force is applied to the front end surface of the valve member, causing the valve member to tilt so that the front end surface tilts relative to an axis of the through-hole, resulting in the reduced-diameter surface engaging the circular rear end edge of the opening surface, a length from a point of engagement between the circular rear end edge and the reduced-diameter surface to the outer peripheral edge of the front end surface of the valve member through an axis of the valve member is equal to or smaller than a diameter of the opening surface.

2. The coupling member of a pipe coupling of claim 1, wherein the spring member is a compression coil spring coaxially set in the through-hole of the coupling body;
   the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

3. The coupling member of a pipe coupling of claim 1, wherein the valve body has a sloped annular surface diverging radially outward as it extends rearward from the rear end edge of the reduced-diameter surface, the annular seal member being fitted to the sloped annular surface.

4. The coupling member of a pipe coupling of claim 3, wherein the spring member is a compression coil spring coaxially set in the through-hole of the coupling body;
   the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

5. The coupling member of a pipe coupling of claim 1, wherein the reduced-diameter surface is adjacent to the circular rear end edge of the opening surface and extends forward of the rear end edge.

6. The coupling member of a pipe coupling of claim 5, wherein the valve body has a sloped annular surface diverging radially outward as it extends rearward from the rear end edge of the reduced-diameter surface, the annular seal member being fitted to the sloped annular surface.

7. The coupling member of a pipe coupling of claim 5, wherein the spring member is a compression coil spring coaxially set in the through-hole of the coupling body;

the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

8. The coupling member of a pipe coupling of claim 1, wherein the reduced-diameter surface is a sloped surface contiguous with the front end annular surface extending rearward from the outer peripheral edge of the front end surface, the sloped surface having a diameter gradually decreasing rearward from the front end annular surface.

9. The coupling member of a pipe coupling of claim 8, wherein the valve body has a sloped annular surface diverging radially outward as it extends rearward from the rear end edge of the reduced-diameter surface, the annular seal member being fitted to the sloped annular surface.

10. The coupling member of a pipe coupling of claim 8, wherein the spring member is a compression coil spring coaxially set in the through-hole of the coupling body;
the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

11. The coupling member of a pipe coupling of claim 8, wherein the reduced-diameter surface is adjacent to the circular rear end edge of the opening surface and extends forward of the rear end edge.

12. The coupling member of a pipe coupling of claim 11, wherein the valve body has a sloped annular surface diverging radially outward as it extends rearward from the rear end edge of the reduced-diameter surface, the annular seal member being fitted to the sloped annular surface.

13. The coupling member of a pipe coupling of claim 11, wherein the spring member is a compression coil spring coaxially set in the through-hole of the coupling body;
the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

14. The coupling member of a pipe coupling of claim 1, wherein the reduced-diameter surface is formed with a step between itself and the front end annular surface of the front end portion, the reduced-diameter surface being coaxial with the front end annular surface and having a uniform diameter.

15. The coupling member of a pipe coupling of claim 14, wherein the spring member is a compression coil spring coaxially set in the through-hole of the coupling body;
the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

16. The coupling member of a pipe coupling of claim 14, wherein the valve body has a sloped annular surface diverging radially outward as it extends rearward from the rear end edge of the reduced-diameter surface, the annular seal member being fitted to the sloped annular surface.

17. The coupling member of a pipe coupling of claim 16, wherein the spring member is a compression coil spring coaxially set in the through-hole of the coupling body;
the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

18. The coupling member of a pipe coupling of claim 14, wherein the reduced-diameter surface is adjacent to the circular rear end edge of the opening surface and extends forward of the rear end edge.

19. The coupling member of a pipe coupling of claim 18, wherein the valve body has a sloped annular surface diverging radially outward as it extends rearward from the rear end edge of the reduced-diameter surface, the annular seal member being fitted to the sloped annular surface.

20. The coupling member of a pipe coupling of claim 18, wherein the spring member is a compression coil spring coaxially set in the through-hole of the coupling body;
the valve member having a projection provided on a center of the rear end surface of the valve body and a spring retaining member formed from a metal plate and connected and secured to the projection, the spring retaining member having an annular spring retaining portion engaged with a front end of the compression coil spring and a tubular spring support portion tubularly extending rearward from an outer peripheral edge of the spring retaining portion.

\* \* \* \* \*